(12) United States Patent
Mason et al.

(10) Patent No.: US 7,970,039 B2
(45) Date of Patent: Jun. 28, 2011

(54) LASER APPARATUS

(75) Inventors: Michael Mason, Redhill (GB); Duncan Parsons-Karavassilis, London (GB); Nicolas Hay, East Grinstead (GB); Matthew Kelly, London (GB); Andrew Comley, Newbury (GB); Burly Cumberland, London (GB); Michael Poulter, Waterlooville (GB)

(73) Assignee: Powerlase Ltd. (GB)

( * ) Notice: Subject to any disclaimer, the term of this patent is extended or adjusted under 35 U.S.C. 154(b) by 282 days.

(21) Appl. No.: 10/590,066

(22) PCT Filed: Feb. 23, 2005

(86) PCT No.: PCT/GB2005/000678
§ 371 (c)(1),
(2), (4) Date: May 24, 2007

(87) PCT Pub. No.: WO2005/083851
PCT Pub. Date: Sep. 9, 2005

(65) Prior Publication Data
US 2008/0037597 A1 Feb. 14, 2008

(30) Foreign Application Priority Data

Feb. 23, 2004 (GB) .................... 0403955.8
Nov. 2, 2004 (GB) .................... 0424271.5

(51) Int. Cl.
*H01S 3/08* (2006.01)
*H01S 3/13* (2006.01)
*H01S 3/093* (2006.01)
*H01S 3/00* (2006.01)

(52) U.S. Cl. .......... 372/98; 372/29.02; 372/72; 359/333

(58) Field of Classification Search .................... 372/13, 372/10, 97, 29.02, 72, 98; 359/333
See application file for complete search history.

(56) References Cited

U.S. PATENT DOCUMENTS 4,675,872 A 6/1987 Popek et al.
(Continued)

FOREIGN PATENT DOCUMENTS

EP 1 037 338 8/2003
(Continued)

OTHER PUBLICATIONS

Koechner, W. "Acousto-optic Q-Switches". Solid-State Laser Engineering, pp. 501-507, Fifth Edition Springer-Verlag, 1999.
(Continued)

*Primary Examiner* — Minsun Harvey
*Assistant Examiner* — Phillip Nguyen
(74) *Attorney, Agent, or Firm* — Reinhart Boerner Van Deuren s.c.

(57) ABSTRACT

In a first embodiment, the invention makes use of a Neodymium doped YAG (Nd:YAG) gain medium placed in an optical resonant cavity formed by two mirrors. Power extraction is maximized for a specific laser cavity. In particular the concave curvature on the rod ends contributes a negative lensing component to modify the strength of the thermal lens. In a second embodiment the present invention uses an amplifier rod medium with curved ends to act as lensing elements to collect emission from the laser gain medium and/or oscillator described in the first embodiment of the invention. The combination of thermal lens and curved rod ends produces a lensing effect which allows light to be directly coupled from a laser. In addition, variation of the input pump power allows for control of the thermal lens formed within the amplifier rod.

18 Claims, 6 Drawing Sheets

U.S. PATENT DOCUMENTS

| | | | |
|---|---|---|---|
| 4,887,270 A | 12/1989 | Austin | |
| 5,237,584 A | 8/1993 | Shannon et al. | |
| 5,268,913 A | 12/1993 | Sakowski et al. | |
| 5,349,603 A | 9/1994 | Kaneda et al. | |
| 5,351,251 A | 9/1994 | Hodgson | |
| 5,699,376 A | 12/1997 | Richmond | |
| 5,907,574 A * | 5/1999 | Karni | 372/95 |
| 5,943,351 A | 8/1999 | Zhou et al. | |
| 6,038,241 A | 3/2000 | Von Elm et al. | |
| 6,130,900 A * | 10/2000 | Black et al. | 372/25 |
| 6,193,711 B1 | 2/2001 | Connors et al. | |
| 6,282,223 B1 * | 8/2001 | Angeley | 372/92 |
| 6,370,168 B1 | 4/2002 | Spinelli | |
| 6,395,000 B1 * | 5/2002 | Mitchell et al. | 606/15 |
| 6,400,495 B1 | 6/2002 | Zayhowski | |
| 6,563,844 B1 | 5/2003 | Young et al. | |
| 6,788,723 B1 | 9/2004 | Langhans et al. | |
| 2002/0093997 A1 * | 7/2002 | Smart | 372/25 |
| 2003/0086447 A1 | 5/2003 | Young et al. | |
| 2004/0028090 A1 | 2/2004 | Pask et al. | |
| 2004/0028108 A1 | 2/2004 | Govorkov et al. | |
| 2005/0215078 A1 * | 9/2005 | Liu et al. | 438/795 |
| 2005/0276300 A1 * | 12/2005 | Ishizu | 372/70 |
| 2007/0153850 A1 * | 7/2007 | Scripsick et al. | 372/39 |
| 2008/0065057 A1 * | 3/2008 | Andriasyan | 606/10 |

FOREIGN PATENT DOCUMENTS

| | | |
|---|---|---|
| JP | 60164386 | 8/1985 |
| JP | 200299520 | 10/2000 |
| JP | 3102886 | 10/2004 |
| WO | WO 99/54970 | 10/1999 |

OTHER PUBLICATIONS

Kogelnik, H. et al. "Laser Beams and Resonaters". Applied Optics, pp. 1550-1567, vol. 5, No. 10, Oct. 1966.

Siegman, A. "Relay Imaging of Apertured Beams". University Science Books, pp. 739-740, 1986.

Koechner, W. "Thermo-Optic Effects and Heat Removal". Solid-State Laser Engineering, pp. 406-422, Chapter 7, Fifth Edition Springer-Verlag 1999.

Sam, R. C. et al.: "Design and performance of a 250 Hz Alexandrite laser". IEEE J. of Quantum Electronics, vol. 24, No. 6, Jun. 1988.

Johnston, T.F. Jr.: "$M^2$ concept characterizes beam quality". Laser Focus World, pp. 173-183, May 19990.

* cited by examiner

LASER APPARATUS

BACKGROUND OF THE INVENTION

Field of the Invention

The present invention relates to a separate solid state laser gain medium and amplifier, in particular for use with a laser and more particularly for use either internally or externally to a laser oscillator cavity.

The use of laser amplifiers comprising a pumped gain medium such as a rod is well known for increasing the optical power emitted from a laser. Amplifiers can be placed at the output of a laser oscillator cavity (extra-cavity) or they can be placed inside the oscillator cavity (intra-cavity) and provide additional optical power. Applications include pulsed or continuous wave (CW) laser, whereby the increased power output available from amplification may be used for any number of laser applications such as thin-film ablation, surface cleaning applications, or any application where high average power is required. However to provide effective amplification it is necessary that efficient coupling of light from the laser to the amplifier takes place.

Various problems arise in known laser gain media and amplifiers, for example thermal effects which can contribute a positive lensing component owing to the heat deposited in the rod which diffuses radially to the cooling reservoir along the rod barrel. This provides a variable refractive index and hence a "thermal lens."

The thermal lens arises as a consequence of a thermal gradient from the rod center to the cooled edge that leads to a radius dependent change to the refractive index. A strong thermal lens has a focal length of a few centimeters to several tens of centimeters. The thermal lens of a rod depends principally on the rod diameter, the total absorbed pump power, and pumped length of the rod.

Various solutions have been proposed; for example, curved mirrors in the laser oscillator to compensate for thermal lens effects but these have various drawbacks, including restricted cavity stability, reduced power, and extraction efficiency, and increased power thresholds. Therefore, such solutions are not appropriate for very high output powers.

One solution is described in U.S. Pat. No. 6,193,711, to Connors, et al., which relates to a flashlamp pumped, gain switched, Er:YAG laser providing control of low repetition rate pulses from the laser by temporal control of the flashlamp current. Concave rod ends are used to provide complete thermal lensing compensation and the short cavity is formed by two plane mirrors.

According to U.S. Pat. No. 6,193,711, current pulses of different widths are used to output pulses of different energies and/or durations. In addition flashlamp control is used to maintain constant thermal lensing by keeping the thermal loading constant. The arrangement negates thermal lensing only for a specific power level. Accordingly a problem with the arrangement described is that very high power, stable output for long cavities is difficult to achieve.

However, complete thermal compensation is inappropriate for a wide operating range of output powers, as the flat cavity mirrors and a zero overall rod lens strength involved, will ultimately result in a Farby-Perot cavity on the edge of stability. Moreover, flashlamp aging can result in reduced output stability.

In another aspect, the coupling requirements between the laser gain medium or laser oscillator and the amplifier medium must take into account thermal lensing effects which can reduce beam overlap and hence energy extraction in a laser gain medium.

Various solutions have been proposed for efficiently coupling light. One example, described in U.S. Patent Application Publication No. US 2004/0028108, to Govorkov, et al., relates to a method of coupling laser light into an amplifier using relay-imaging optics. FIG. 1 illustrates a schematic of a prior art arrangement required to relay image from an oscillator gain medium into a target amplifier medium. In this example a unit magnification telescope 10 comprising lenses 12, 14 is used to image each point in space in the oscillator 16 to the corresponding point in the amplifier 18. The telescope 10 may magnify or de-magnify in order to account for differences in sizes of gain media when compared to the laser oscillator. A further method described in U.S. Pat. No. 5,237,584 to Shannon, et al. uses curved cavity mirrors to image one amplifier module to the next.

However, several problems exist with existing relay imaging techniques. Using additional optics increases the number of components, and can result in the formation of intermediate foci that can damage the optical components. Moreover, additional optics require precise alignment to achieve maximum coupling efficiency.

In another aspect it is well known to use techniques such as Q-switching to obtain pulsed operation of lasers. One known approach is described in "Acousto-optic Q-Switches, page 501, Solid-State Laser Engineering, W. Koechner, Fifth Edition Springer-Verlag 1999." According to the approach described there, use of a single acousto-optic (AO) modulator is provided as a Q-switch in a cavity comprising a gain medium and two cavity mirrors. The Q-switch is used as a loss-modulator allowing the energy stored in the laser rod to build up to high levels when the loss is high, which can be released as a short pulse of light when the loss is low. However, such an arrangement can suffer at high modulator powers where the Q-switch can become polarization dependent meaning that it may not be effective for all polarizations of light.

In a further aspect, frequency multiplication is known in lasers to provide desired output frequencies from a fundamental laser frequency. For example in U.S. Pat. No. 5,943,351 to Zhou, et al. third, fourth, fifth, and sixth order harmonics are generated from the fundamental laser wavelength. The design uses a linear configuration with the gain medium, Q-switch, cavity mirrors, and harmonic generation crystal all placed along the cavity optical axis. In particular the main cavity is bounded by mirrors and a second harmonic generator is provided within the cavity between a cavity mirror and a further internal mirror. The output of the cavity is received by a further harmonic generator external to the cavity which combines the fundamental and second harmonic radiation. Nonlinear crystals are used to convert the fundamental laser radiation to shorter wavelengths (harmonic conversion). The effectiveness of a particular crystal for harmonic generation can be characterized by its nonlinear coefficient, the higher the better. In order that the crystal converts efficiently, the propagation vector of the input laser beam must be carefully aligned with the crystal axis. Deviations from the optimum angle lead to a reduction in conversion efficiency. Maximum harmonic conversion efficiency is achieved by aligning a low $M^2$ factor ($M^2$, also called the beam quality factor or the beam propagation factor, is a parameter for quantifying the beam quality of laser beams) beam to a nonlinear crystal with a high nonlinear coefficient. Low $M^2$ beams have a well defined propagation vector; therefore the entire beam is well aligned with the crystal axis. Producing a high power low $M^2$ beam is very difficult however and so this is not necessarily the most effective way of producing a high power green beam.

SUMMARY OF THE INVENTION

The invention is set out in the claims. As a result of the invention in one embodiment a Q-switched, diode pumped, Nd:YAG high power laser is provided avoiding at least some of the problems with the prior art. Additionally, because of the profiling of the gain medium ends the beam passes through the gain medium and achieves a high extraction efficiency because the beam volume overlaps well with the gain volume inside the laser medium. Maximum power is extracted for a specific cavity. This allows simple and efficient scale up adding additional amplifier modules. Each additional gain module adds ~200 W to the output. Moreover, the beam quality $M^2$ increases by only ~1.5 for each additional amplifier.

DESCRIPTION OF THE DRAWINGS

Embodiments of the invention will now be described, by way of example, with reference to the drawings of which.

DETAILED DESCRIPTION OF THE PREFERRED EMBODIMENT

Figure 1:
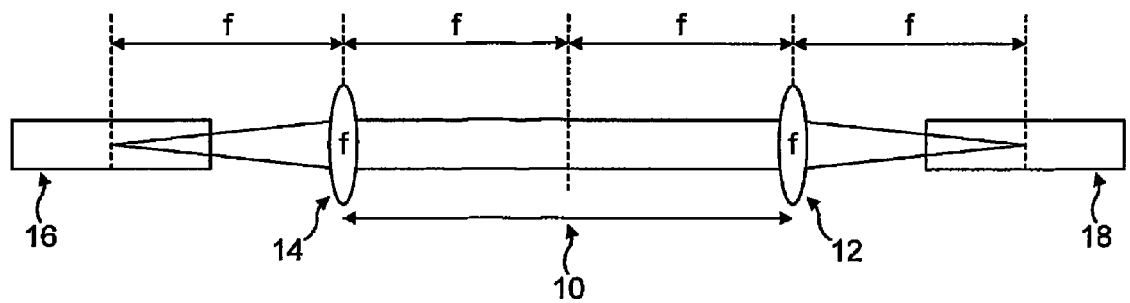
FIG. 1 is a schematic view of a relay-image system embodying the prior art.
Figure 2:
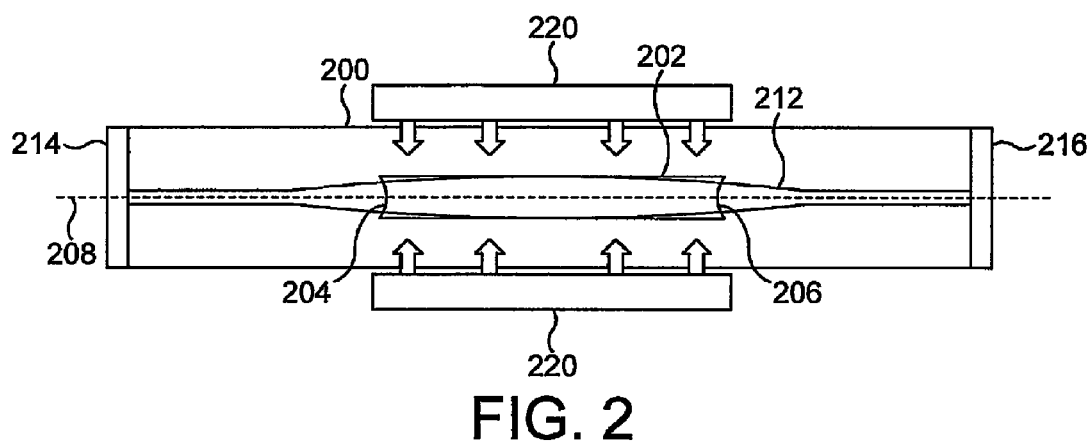
FIG. 2 is a schematic side view of a thermally modified laser cavity according to the present invention.

In overview and referring to FIG. 2 a first embodiment of the invention makes use of a Neodymium doped YAG (Nd: YAG) gain medium 202 placed in an optical resonant cavity 200 formed by two mirrors 214, 216 one of which is partially reflective (output coupler) and one of which is totally reflective. The gain medium is optically side-pumped, by laser diode bar emitters 220, i.e. in a direction orthogonal to the gain medium longitudinal axis. The arrangement of the optical cavity and the diode bar emitters form an elongate chamber with the gain medium aligned co-axially at the center of the arrangement. The diode pumped configuration enables the laser to operate at high average powers and for it to be pumped very hard.

In order to achieve high power outputs from the laser, the gain medium is pumped by the high power laser diode bar emitters, causing thermal expansion effects in the gain medium. Such effects may lead to thermal lensing which can have a detrimental effect on the output characteristics of the laser. However by providing a gain medium where the ends form curved surfaces, the invention alleviates sensitivity to thermal lensing effects while maximizing power extraction for a specific laser cavity. In particular, the concave curvature on the rod ends contributes a negative lensing component to modify the strength of the positive thermal lens.

The exact radius of curvature of the rod end depends on the power of the pump diodes, the diameter of the rod, the length of the rod, and the required performance and/or use of the gain module. The thermal lens modification in turn improves the pulse repetition rate range of the laser and allows the maximum amount of overlap between the cavity mode and the gain profile in the rod giving the highest extraction efficiency possible (i.e. maximum power output). These improvements are normally particularly difficult to achieve when a long cavity has to be used in order to incorporate Q-switches and other cavity components as described below.

Therefore, contrary to popular design criteria, the cavity of the present invention is designed to operate at the maximum $M^2$ the system will support. This gives the laser a degree of stability in terms of robustness (by appropriate profiling of the rod ends) to changes in thermal lensing which occur due to natural differences between gain modules or changes due to pump diode aging. The $M^2$ of the system is additionally determined by the cavity Fresnel number which is related to rod diameter (or other limiting aperture) and cavity length, and by the thermal lens (ultimately determined by pump power and gain medium type). The $M^2$ of the system is chosen to give the best compromise between power extraction efficiency and focusability of the output beam. The cavity is also designed to give stability of performance, for example, in terms of output power.

Cavity stability can be quantified using the method laid out in "Laser Beams and Resonators" by Kogelnik and Li, Applied Optics, Vol. 5 No. 10, October 1966. The stability parameters in a cavity with flat mirrors are given by the following equations Equation 1 and Equation 2.

Where:
$G_1$, and $G_2$ are the stability parameters for each cavity.
$f_1$, and $f_2$ are the equivalent focal lengths of the laser rod ends.
$L_1$, $L_2$, and $L_3$ are the lengths between the first mirror and the first rod end, the rod length, and the length between the second rod end and the second mirror.

$$G_1 = 1 - L_2\left(\frac{1}{f_1} + \frac{1}{f_2}\right) + L_3\left(\frac{L_2}{f_1 f_2} - \frac{1}{f_1}\right) \quad \text{Equation 1}$$

$$G_2 = 1 - L_1\left(\frac{1}{f_1} + \frac{1}{f_2}\right) + L_3\left(\frac{L_1}{f_1 f_2} - \frac{1}{f_2}\right) \quad \text{Equation 2}$$

Figure 3:
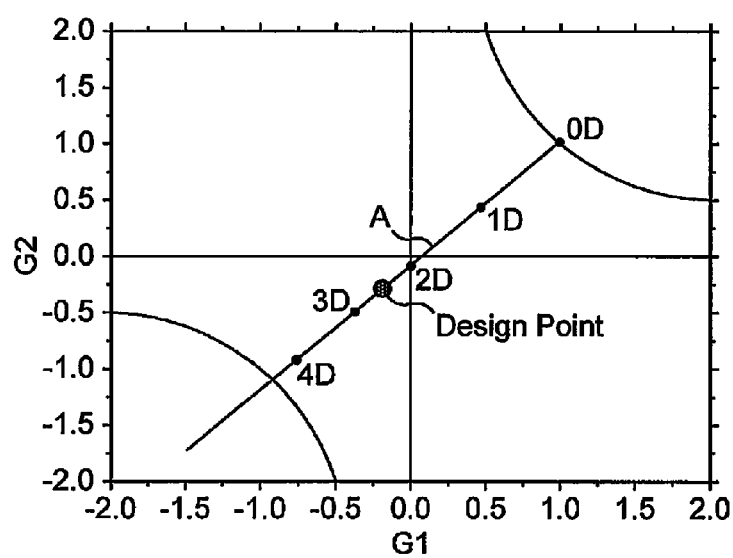
FIG. 3 is a cavity stability diagram.

FIG. 3 shows the cavity stability diagram for a cavity which includes two gain modules flat cavity mirrors. The shaded regions show the areas in which the cavity is considered stable. A stable cavity is one that will sustain a mode that does not leave the cavity on successive round trips. The diagonal line A in FIG. 3 shows the path of the cavity stability as the lens strength in the two gain modules is increased from zero Diopters. It is important to design the cavity so that at the chosen input power of the cavity lies in the middle of the stable region in the stability diagram. This ensures the output parameters of the laser, such as power and pulse duration remain stable. It is also important to make sure the cavity does not pass into an unstable operating regime (indicated by the white areas of FIG. 3) as the pump power is increased. This leads to instabilities in performances of the laser. As can be seen in FIG. 3 the diagonal line passes briefly into the white region as the pump power increases. This is inevitable in a cavity with two gain modules and other components (such as Q-switches). The width of this instability is determined by the asymmetry of the cavity. This can be caused by small asymmetries in the optical path length between the gain modules and cavity mirrors and differences between thermal lens strength or rod-end radius of curvature between the gain modules. It is important to make sure the design point is as far away as possible from this instability, whilst remaining within a stable operating region.

Figure 4:
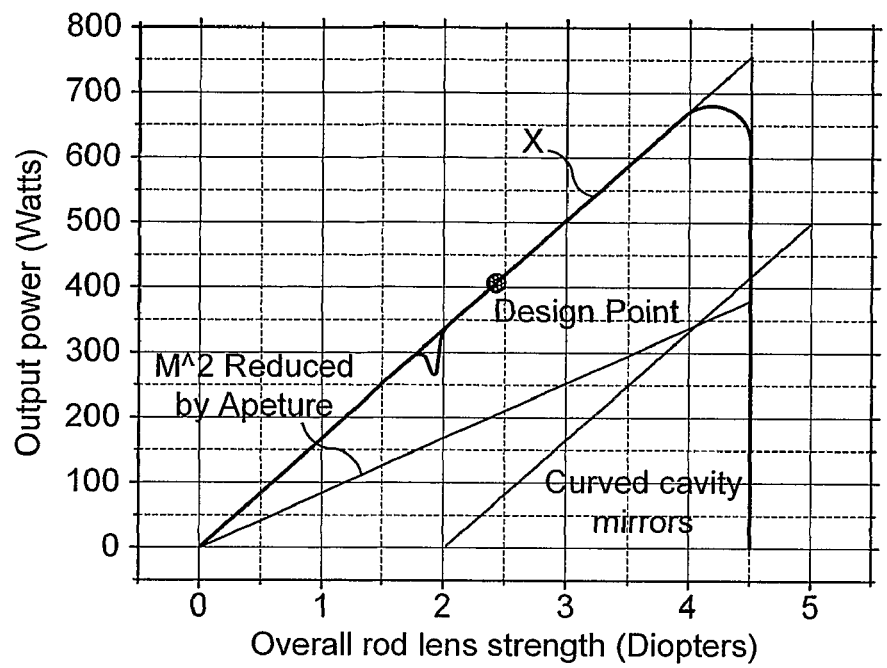
FIG. 4 is a plot of output power against overall rod lens strength.
Figure 5:
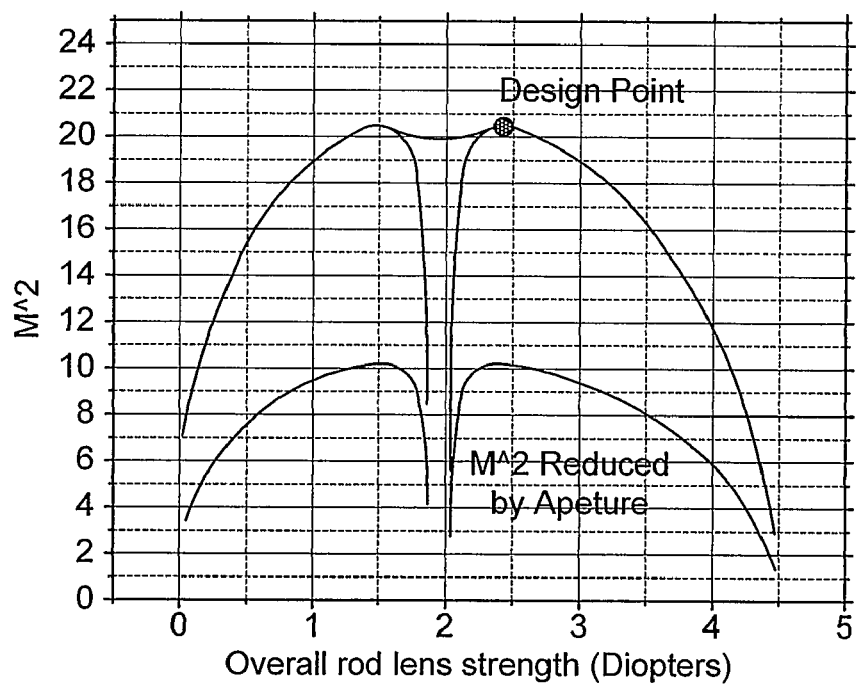
FIG. 5 is a plot of laser beam quality ($M^2$) against rod lens strength.

FIG. 4 shows the relationship between the output power of the laser cavity and overall rod lens strength (a combination of thermal lens and rod end curvature). The dip in the middle of the curve corresponds to the instability (described above) at the center of the stability diagram. In reality, the effects of aberrations in the rods bridge the gap between the two stable regions of the $M^2$ curve. The laser rod does not stop lasing (as suggested by the steep dip) unless the gap is very large (greater than approximately 1 Diopter. The smoothed section at the far right of curve X (uppermost curve) shows how the power curve is modified by aberrations in the rods just before the cavity becomes unstable and the power drops to zero. The cavity is designed to operate at the peak of $M^2$ as shown in FIG. 5. This is done to ensure the cavity operates in the middle of a stable region (~2.5 Diopters) and to give the laser robustness to changes in thermal lensing in the rods and to natural differences between the gain modules. As discussed above, changes in thermal lensing can occur when pump diodes age and when the power level in the cavity changes, for example due to changes in operating repetition rate. Differences between gain modules can occur due to small tolerance differences in the components used to construct them, such as rod doping concentration or rod-end radius of curvature. In this way it can be seen that if the rod lens strength does change for any reason, the output parameters of the laser, including $M^2$, remain robust according to the invention. When the $M^2$ of the system is determined by the pump power (and ultimately rod lens strength), the cavity operates on a steep part of the curve (for example at 1 Diopter in FIG. 5) and small changes in pumping level can lead to large changes in output parameters such as $M^2$ and output power. When the cavity is operating in a stable region as discussed the gradient of the stability curve shown in FIG. 5 is substantially zero, that is the curve is predominantly flat and unchanging. The $M^2$ of the cavity can be varied by changing the Fresnel number of the cavity. This can be done by introducing an aperture into the cavity (generally close to a gain module) without affecting the stability of the laser.

Additionally, as will be appreciated by those skilled in the art, the Fresnel number can be varied by varying gain medium end curvature and/or the geometry of the cavity, for example its length and/or width, or the gain medium dimensions, for example diameter and/or length, thereby varying the $M^2$. Furthermore, $M^2$ can be varied by changing the gain medium absorption for example by doping the gain medium; by varying the refractive index or its distribution in the gain medium through, for example, variation of the temperature gradient through or across the rod.

Figure 6:
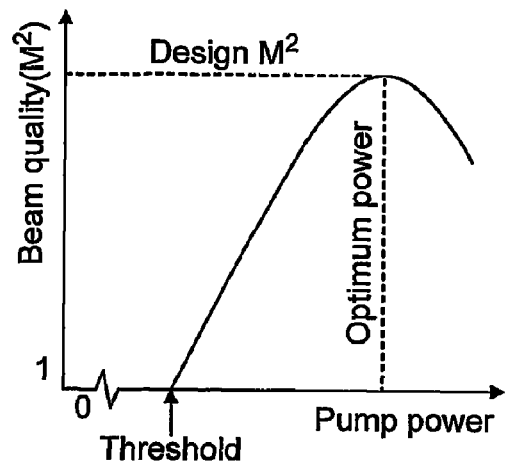
FIG. 6 is a plot of laser beam quality ($M^2$) against laser pump power.

In particular, rather than negating thermal lensing, which can provide acceptable operation only under very specific operating conditions and provide unstable operation outside those conditions, the present invention utilizes thermal lensing. This is achieved by designing the cavity such that a desired strength of thermal lens is achieved in the area of the preferred operating conditions. In particular the gain medium is profiled so as to operate, in conjunction with the other optical elements in the cavity, to provide an appropriate beam quality $M^2$ centered on a desired operating pump power. This can be further understood with reference to FIG. 6 which shows, for a given cavity design, the variation in $M^2$ against pump power. As can be seen, $M^2$ varies approximately parabolically with pump power and peaks at a specific center value. Variations of pump power (and therefore thermal lens strength) around that center value lead to only minor changes in the value of $M^2$ and hence only minor variation of the beam quality. Accordingly the gain medium is profiled such that, in conjunction with thermal lensing, $M^2$ is centered on the desired operating power of the laser. In this way, maximum power extraction occurs for a specific cavity operating at a specific pump power. The cavity should be optically symmetrical so that the relationship between pump power and output power is approximately linear. Also the cavity should be long enough to be able to incorporate the Q-switches and other required cavity components.

In addition, the mirrors forming the optical cavity, as described above, can be planar, thus forming a Fabry-Perot (F-P) type cavity. The combination of curved gain medium ends mounted co-axially within an F-P cavity, further increase insensitivity to thermal lensing effects and changes in those effects resulting in yet further improved output characteristics. In the preferred embodiment of a high power resonant Q-switched cavity in the kilohertz regime, this is particularly advantageous as changes in the pulse repetition rate can cause changes in thermal lensing conditions to which the cavity is robust.

Yet further, the use of curved gain medium ends can also be employed externally to the laser oscillator in a laser amplifier. Optimal coupling between the oscillator and amplifier can be achieved through relay imaging. A typical approach to this is described in "Relay Imaging of Apertured Beams," page 739, Lasers, A. Siegman, University Science Books, 1986 in which the transfer of an apertured beam in an oscillator to an amplifier with optimal coupling is achieved by use of a telescope between the two. This method allows the input beam to an amplifier to be optimally mode-matched to the gain profile. According to the invention, however, matching the thermal lens of the amplifier with the originating laser gain medium ensures mode matching between the respective media resulting in an overlap of the gain profiles. A seed beam that is to be amplified will suffer positive lensing due to the induced thermal lens in the amplifier gain module. Thermal lens modification allows the effects of thermal lensing to be reduced and therefore to optimize gain overlap. Further to this, when the gain module amplifier is used in conjunction with a laser oscillator using the same gain modules, relay imaging can be achieved without the use of an intermediate telescope. A further advantage with this system is that the spatial profile of the seed beam will be matched to the gain profile of the amplifier (mode-matching). Further gain modules may be added that mirror the configuration of the gain modules in the oscillator cavity.

In addition, preferably two orthogonally crossed acousto-optical (AO) modulators are introduced into the oscillator cavity between the laser medium and the one of the two mirrors forming the cavity, to provide a Q-switch. Generally, a Q-switch is used as a loss-modulator allowing the energy in a cavity to build up to high levels when the loss is high, which can then be released as a short pulse of light when the loss is low. AO modulators consist of a transparent optical material that becomes a diffraction grating when a powerful radiofrequency (RF) signal is applied via a piezoelectric transducer. The diffraction grating ejects light out of the cavity, therefore providing a loss. The depth of modulation that a particular polarization experiences depends on, among other things, the RF power supplied. For most RF powers, one polarization experiences more modulation than the other when the cell is used in compressional mode. For this reason, single AO Q-switches are often used in cavities with a single polarization. There is usually a particular (low) RF power that can be applied where the modulation is the same for two orthogonal polarizations. A single cell could be used for a low power, unpolarized laser in this regime of operation. However at very high laser powers (for example 100's of Watts) and therefore very high gain, a large depth of modulation is required to Q-switch the cavity. For this reason the power applied to the AO modulators is turned up very high (up to 100 W) to maximize the loss modulation. This causes the modulation to be highly polarization dependent and so two orthogonal cells are used according to the invention to achieve the required modulation. The cells should be aligned according to either the Bragg or near Bragg regime for optimum performance.

Using crossed AO cells orthogonal to the optical axis of the laser cavity further provides a non-polarization sensitive hold-off which can support unpolarized, multimode operation, even if the individual cells become polarization sensitive as a result of high RF power operation.

Additionally, it is possible to replace the reflective planar mirror, as outlined above, by coating the external surface of the nearmost AO modulator forming a Q-switch with a high reflection (HR) material. The F-P cavity is thus formed of one planar partially reflective mirror (output coupler) and the rear HR coated surface of the AO modulator furthest from the gain module, thus negating the need for a cavity mirror. This also provides faster switching speeds, as the switch time is dependent on the beam size in the modulator. The beam size is smallest at the cavity mirrors, so the fastest switching speed will be achieved at the extremes of the cavity.

The laser described herein is often used to produce bursts of short pulses. Owing to an excessive build up of gain, the first pulse in the burst can be different (generally more intense) than the rest. In order to compensate for this a method of pulse control is provided that controls the gain by changing the pump laser diode power between bursts of pulses. If the time between bursts of pulses is long (hundreds of milliseconds) the thermal lens strength increases due to the lack of intracavity power. To control this, the diode power is reduced slightly to change the strength of the lens to the same level it would be if the laser were still lasing. In order to compensate for the excessive gain build up just prior to the first pulse, the diode power is briefly taken below the cavity lasing threshold to deplete the gain from the gain module. The first pulse will then experience the same gain as the rest of the pulse train. This method (applicable for any Q-switched, diode pumped laser), in conjunction with other AO pulse control methods (for example, First Pulse Suppression which is described in U.S. Pat. No. 4,675,872, to Popek, et al.) provides full control of the pulses emitted by the laser for any duty cycle and repetition rate.

In addition, the optical cavity can include a frequency doubling component or any appropriate harmonic generator, for second harmonic generation. The frequency doubling component is formed of a non-resonant sub-cavity and a frequency doubling crystal. The non-resonant sub-cavity replaces the partially reflective planar mirror (output coupler) of the F-P optical cavity and includes an additional dichroic planar mirror (in-line mirror) placed between the gain medium and the frequency doubling crystal. The cavity mirrors are highly reflective to the fundamental frequency of the cavity by virtue of appropriate coatings. Furthermore, the additional in-line mirror reflects the doubled frequency but passes light at the fundamental frequency, while the cavity mirror forming the other end of the non-resonant internal cavity passes the doubled frequency. The frequency doubling crystal can be any appropriate material such as Lithium triborate ($LiB_3O_5$, referred to herein as LBO) placed within the sub-cavity. The advantage of such an arrangement is that second harmonic generation is supported for high power multimode operation (as well as fundamental $TEM_{00}$ mode operation), and the output is all in the same direction of the same frequency and is used directly, for example on a work piece.

Referring now to FIG. 2, a laser cavity 200 including a laser rod with thermal lens modification 202 can be seen in more detail. For the purposes of simplicity, other components such as additional optics are not shown. The laser rod 202 is preferably formed of Nd:YAG and is mounted in the cavity 200 in any appropriate manner. In the preferred embodiment, the laser is a high power laser (150 to 500 W), with very high pumping power (up to 1500 W) such that thermal effects in the laser rod become very significant and in particular "thermal lensing" takes place. Thermal lensing arises as a result of various physical mechanisms (for example the quantum defect of the gain medium) but all result in the generation of a thermal gradient across the cross-section of the laser rod 202 providing a variable refractive index and hence a lensing effect. As can be seen from FIG. 2, the ends 204 and 206 of the laser rod 202 relative to the laser axis 208 are concavely curved to modify the strength of the thermal lensing. Appropriate optics, such as a quartz rotator in a dual gain module cavity or a Faraday rotator in a single gain module cavity, can be introduced to compensate for any increased bi-focusing effects arising as a result of the end curvature.

The laser cavity 200 further includes mirrored ends 214 and 216 providing, as is well known, a resonant cavity to allow lasing. In the preferred embodiment, the mirrors are flat, providing a Fabry-Perot cavity. As a result, the cavity 200 can support a multi-mode cavity mode over a range of strengths of thermal lens by virtue of the flat cavity mirrors 214 and 216 and the profiled laser rod ends 204 and 206. Additionally, an aperture can be included in the cavity, placed close to the gain module to change the Fresnel number of the cavity, thereby allowing the $M^2$ of the cavity to be changed.

The aperture can be formed in any appropriate manner and from any appropriate material. Preferably, however, it is formed of a ceramic material so that it can withstand the high laser powers in the cavity. The aperture may also be variable, allowing continuous variation of the cavity $M^2$.

The materials and fabrication of the components of the laser and the laser itself are well known to one skilled in the art and are not described here. For example, the pump array can be any high power laser diode array with suitable emission wavelength to pump the gain medium, the laser rod can be of any appropriate material, for example Neodymium doped YAG (Nd:YAG) single crystal or ceramic or any other suitable laser medium, and the laser cavity can be defined by any suitable high power laser mirrors, such as those available from CVI Laser Inc.

As a result of the arrangement described with reference to FIG. 2, high power, unpolarized, multi-mode laser output can be obtained with high pumping power and modification of the thermal lensing. In particular and as discussed in more detail below, unpolarized, nanosecond pulsed output can be obtained with maximum power efficiency.

In a second embodiment, the present invention uses an amplifier rod medium with curved ends to act as lensing elements to collect emission from the laser gain medium and/or the oscillator described in the first embodiment of the invention. The combination of thermal lens and curved rod ends produces a combined lensing effect which allows light to be directly coupled from a laser without the need for additional optics. In addition, variation of the pump power allows for control of the thermal lens formed within the amplifier rod.

Figure 8:
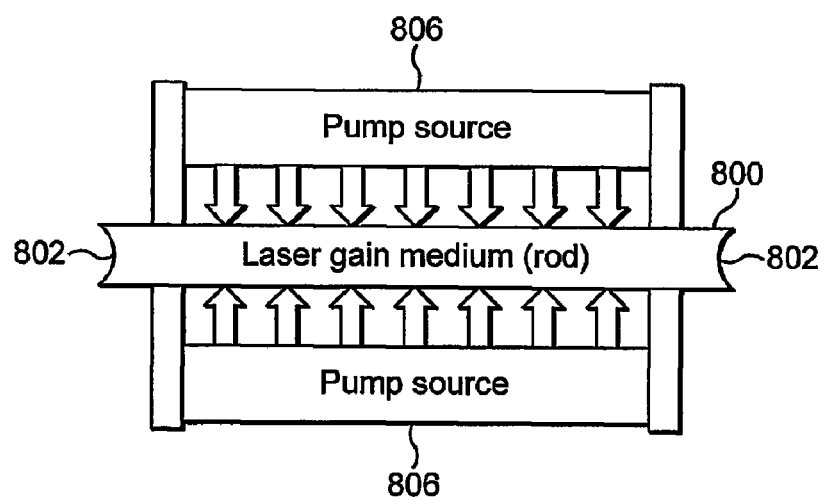
FIG. 8 is a diagram of a pumped amplifier module.

FIG. 8 shows an amplifier module comprising a solid state Neodymium doped YAG (Nd:YAG) gain medium 800 according to the invention. The gain medium is optically side pumped, by laser diode bar emitters 806, in a pump direction orthogonal to the gain medium longitudinal axis. The pump source and gain medium are cooled in order to remove excess heat. Water cooling is common, but any appropriate method as known in the art may be used. The laser rod 800 in the gain module has concave ends 802 and 804. This adds a negative lensing component that modifies the positive thermal lens induced inside the laser rod. A strong thermal lens occurs as a consequence of the high pump powers required to produce the high output powers. In a similar manner to that described above, or as described further below, the overall effect of the thermal lens and rod-end curvatures provides a weakly positive lens that ensures the laser cavity operates in a stable configuration.

Figure 9:
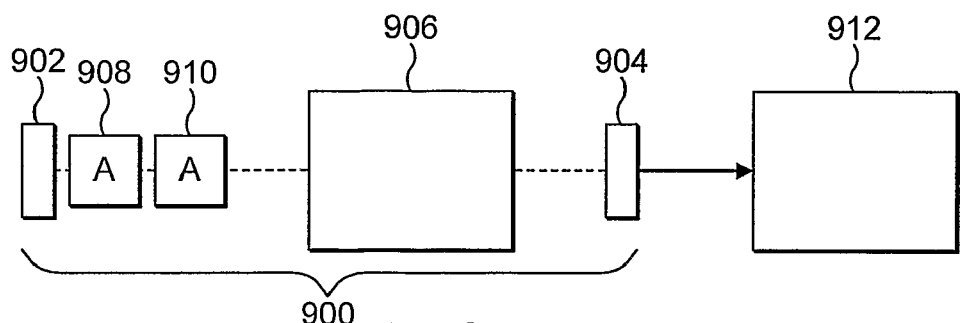
FIG. 9 shows a laser module for use in conjunction with the invention.

As shown in FIG. 9, the amplifier gain module 912 is added after a laser oscillator 900, which is preferably a mirror image of the laser gain module described herein. In particular the amplifier module 912 receives an input laser beam from the laser oscillator 900 part of the system comprising a Fabry-Perot-style cavity (formed by two flat mirrors 902 and 904) with a gain module 906 and two acousto-optic (AO) Q-switches 908 and 910 between them. The Fabry-Perot cavity is formed by a high reflector mirror 902 and an output coupler mirror 904. The gain module 906 provides the gain for the cavity and loss modulation is provided by a pair of orthogonal acousto-optic modulators (AOM's). When the AOM's are fully on (high power RF signal applied), they eject light from the cavity providing a loss. This allows the energy in the cavity to build up to a high level. When the AOM's are turned off, the cavity is allowed to lase and the stored energy is released as a short pulse of light. This process is repeated many thousands of times a second, producing pulses with both a high peak power and a high average power. This configuration is capable of delivering output powers of more than 400 W at repetition rates between 3 and 100 kHz with pulse durations between 30 and 300 ns. The beam quality of the system ($M^2$) is approximately 22.

Figure 10:
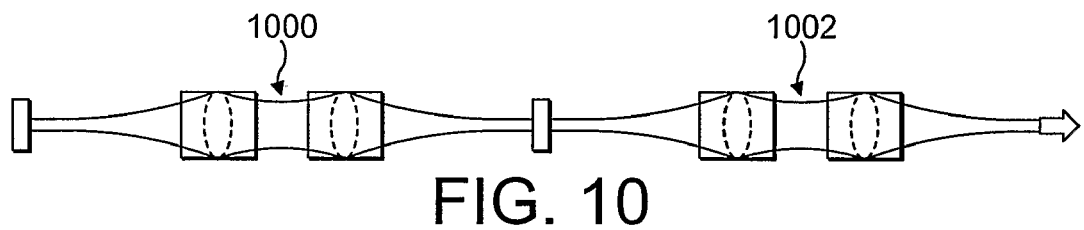
FIG. 10 shows operation of multiple amplifier modules in a mirror-image configuration.

The light emitted by the laser oscillator 900 couples naturally into the amplifier gain module 912 as the photons effectively do not see the output coupler mirror; they pass through the additional gain module as if it were another intracavity module, as discussed in more detail below and shown in FIG. 10, where multiple replicated cavities 1000 and 1002 are shown. Where two gain modules are used inside the oscillator, the gain overlap is not as optimal as when using a single gain module. It is optimal, however, when considering a compact cavity design, i.e. short distance between gain modules.

Figure 7:
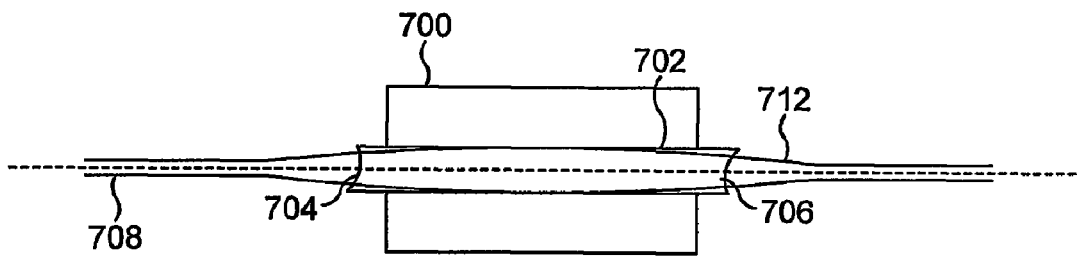
FIG. 7 is a schematic side view of an amplifier module according to the present invention.

Referring to FIG. 7, a gain module 700 is shown including a gain rod 702. As discussed above, such an amplifier module can be coupled to the output of a laser oscillator to act as an amplifier. In this case, ensuring that the thermal lens strength of the gain rod matches that of the laser rod ensures a mode matched configuration to optimize gain overlap and therefore efficiency and output power. In order to prevent back reflection from the gain module 700 to the laser oscillator 200, the rod ends can be wedged or centered with respect to the rod longitudinal axis such that back reflection of the laser beam is directed away from the oscillator cavity 200.

As discussed above, the ends of the amplifier medium 802 and 804 are made concave to provide a lensing component (in most cases this profile will be a concave radius of curvature in the order of tens of centimeters). In the embodiment shown, the laser and amplifier modules have the same dimensions and provide the same equivalent lens strength for a given pump power. At the requisite pumping power, the combination of the positive thermal lensing and the negative rod end lens produces, overall, a weakly positive lens sufficient to couple the maximum amount of light into the amplifier without over or under filling the rod. Ideally the amplifier is a mirror image of the laser gain medium, except when the presence of laser light in the rod modifies the strength of the thermal lens such that a different pump power is required to match thermal lens in the oscillator and amplifier gain modules.

Whereas, where the laser cavity is configured as described above, the amplifier module can be designed identically, it will be seen that the amplifier module can be tailored to cooperate with any arbitrary input laser beam. In this case, the curvature of the rod ends is designed to provide optimum coupling and can be understood from the following discussion of a simple model for typical laser amplifiers that use a number of input parameters to predict the output. The following Equation 3 defines such a model in terms of fluences (defined as pulse energy divided by beam area in joules per square centimeter):

$$\Gamma_{out} = \Gamma_s \ln\left\{1 + G_0\left[\exp\left(\frac{\Gamma_{in}}{\Gamma_s}\right) - 1\right]\right\}. \qquad \text{Equation 3}$$

where $\Gamma_{out}$ is the output beam fluence of the amplifier, $\Gamma_s$ is the saturation fluence of the gain medium, $\Gamma_{in}$ is the input beam fluence, and $G_0$ is the small signal gain. The small signal gain depends on the following:

$$G_0 \sim P_p \eta_T \eta_E \qquad \text{Equation 4.}$$

where $P_p$ is the total input pump power; $\eta_T$ is the transfer efficiency from pump power to stored energy in the rod; and $\eta_E$ is the extraction efficiency.

The small signal gain determines the output power of the amplifier for a given input power, beam size, and repetition rate. The higher the repetition rate, the lower the gain available per pulse, although the higher the total output power. The transfer efficiency ($\eta_T$) is a consequence of the quantum defect of the gain medium and of the design of the pump chamber surrounding the rod. The extraction efficiency ($\eta_E$) is determined by how well the input beam overlaps with the gain volume in the laser rod. Extraction efficiency is also affected by the quality of the input beam, known as $M^2$.

Figure 11:
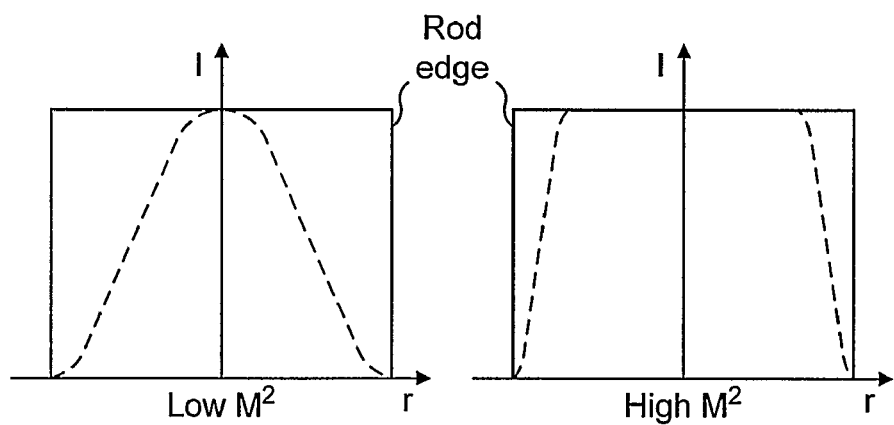
FIG. 11 is a comparison of gain overlap between low $M^2$ and high $M^2$ beams.

To illustrate the effect of $M^2$ on the extraction efficiency of the amplifier, a gain volume in the laser rod with a uniform distribution is illustrated in FIG. 11. The gain profile is shown by the solid curve, and the dashed curves represent the beam profile as a function of distance from the center of the rod (r). The curve on the left shows how a beam with a low $M^2$ overlaps poorly with the gain profile, leaving lots of unused gain after the beam has passed through the amplifier. The curve of the right shows how a beam with a high $M^2$ overlaps well with the gain profile extracting the available gain more efficiently. From this illustration, it is easy to appreciate that the higher the $M^2$, the more efficiently the energy is extracted.

To illustrate the importance of beam overlap and the effect of thermal lensing, it will be seen that where a collimated input beam is sent into a gain module 20 with zero thermal lens (see FIG. 12*a*), the beam passes through the gain medium and achieves a high extraction efficiency because the beam volume overlaps well with the gain volume inside the rod. The maximum extraction efficiency is in this case limited by the $M^2$ of the input beam, as mentioned above.

However, pumping the amplifier hard to produce the desired increase in output powers (approximately 200 W per additional amplifier) produces a positive thermal lens effect in the amplifier gain medium.

Figure 12:
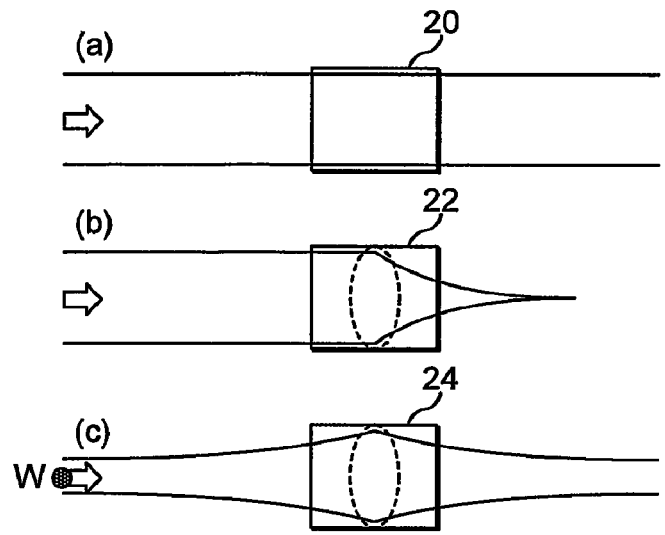
FIG. 12a is a schematic view of good gain overlap with zero thermal lens.
FIG. 12b is a schematic view of poor gain overlap with strong thermal lens.
FIG. 12c is a schematic view of maximized gain overlap with thermal lensing such that the beam passes through the gain medium symmetrically.

When a strong thermal lens is present as shown by the dashed curved lines in FIG. 12*b*, the collimated input beam overlaps poorly with the gain volume because the beam diameter quickly reduces as it passes through the rod. Maximum overlap (for a beam with a given $M^2$) is achieved when the input beam passes symmetrically though the gain medium. This is especially true when there is more gain around the center axis of the rod than around the edges, as is most commonly the case.

Accordingly, to pass the beam though the gain module symmetrically, additional beam conditioning optics are required. The beam conditioning optics modify the divergence of the input beam so that it appears there is a beam waist in the position marked "W" in FIG. 12*c*, close to the amplifier module 24. The stronger the thermal lens, the closer the waist needs to be to the amplifier module to pass through it symmetrically.

Figure 13:
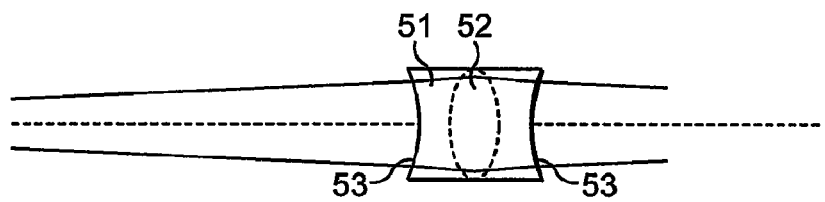
FIG. 13 is a schematic view showing thermal lens compensation.

The lensed surfaces 802 and 804 of the amplifier medium or laser gain medium (800 are achieved by placing a radius of curvature (RoC) on the end of the rod. In the special case where there is zero thermal lens effects in the gain medium, the RoC may be convex (positive lens) in order to collimate a diverging beam through the rod. In general, a concave RoC will be used on the end of the rod to provide a negative lensing component to balance the positive thermal lens. FIG. 13 shows how a gain medium 51 exhibiting strong thermal lensing 52 may be optimally coupled into by using a concave RoC 53 on the input side of the laser rod. The beam must have the correct diameter at the input side of the rod; the rod curvature corrects for non-optimal input beam divergence. The RoC on the exit side of the rod may be any curvature suitable for subsequent use of the output beam. In FIG. 13, the exit RoC is the same as the input.

Accordingly an appropriate RoC must be determined for the desired operating conditions. For clarity, the following discussion relates to determining the appropriate RoC for the amplifiers medium rod ends. However, it will be appreciated by those skilled in the art that a similar method can be employed for determining RoC for the oscillator gain medium.

First, the degree of thermal lensing is identified. The thermal lens of a particular amplifier module can be determined by shining a helium-neon (HeNe) laser through a rod with flat ends when it is fully pumped by the pump source. The HeNe laser will be focused at a point equal to the thermal focal length of the rod at 633 nm. An equivalent lens focal length can then be calculated for the lasing wavelength of the amplifier module. This thermal focal length can then be used in a cavity modeling software package (such as Paraxia) to model the behavior of the cavity as a function of pump power. A second method involves calculating the focal length of the rod using heat diffusion and refractive index modification equations, and then providing a suitable radius of curvature on the rod ends to give the required cavity stability. Such a method has been described in "Chapter 7. Thermo-Optic Effects and Heat Removal," page 406, *Solid-State Laser Engineering*, W. Koechner, Fifth Edition, Springer-Verlag 1999. The calculated thermal focal length can be used in a cavity modeling package as above. The cavity should be designed such that the lasing threshold is low (for high power operation), and the $M^2$ of the cavity mode should peak at the desired operational pump power. This then ensures maximum cavity stability and insensitivity to changes in thermal lensing due to repetition rate changes.

Figure 14:
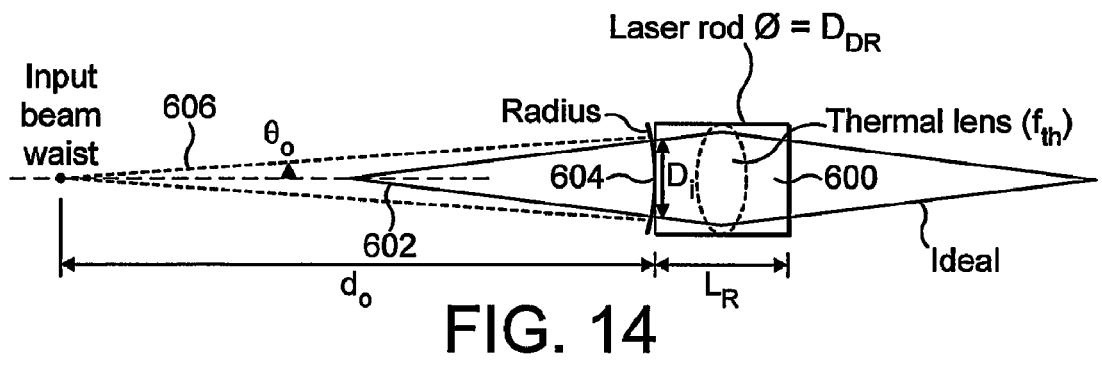
FIG. 14 shows the principal design criteria for the present invention.

Once the thermal focal length of the amplifier module laser rod ($f_{th}$) is known, the rod-end radius of curvature can be calculated for given input beam parameters using a thin lens model. FIG. 14 shows how an ideal input beam 602 optimally overlaps with the gain volume 600 in the rod (solid beam). The ideal input beam 602 has an ideal diameter at the input rod end 604 and ideal divergence ($D_i$) associated with it, for the case of a rod with flat ends. The beam diameter and divergence of an arbitrary input beam 606 (dashed beam) must be matched in order to achieve optimum extraction efficiency. The beam diameter at the rod input can be calculated approximately by the following equation:

$$D_i = D_R - \frac{D_R L_R}{4 f_{th}}. \qquad \text{Equation 5}$$

where $D_R$ is the rod diameter, $L_R$ is the rod length and $f_{th}$ is the rod thermal focal length. The waist of an arbitrary input beam must be placed a distance $d_0$ from the amplified module in order that its diameter equals $D_i$ at the input rod end. $d_0$ is defined as follows:

$$d_0 = \frac{2\tan\theta_0}{D_1}. \qquad \text{Equation 6}$$

where $\theta_0$ is the arbitrary input beam divergence angle. In order to modify the divergence of the arbitrary input beam so that it matches the divergence of the ideal input beam inside the amplifier module, a negative radius of curvature given by the following equation must be placed on the end of the rod:

$$R = \frac{d_0(4f_{th} - L_R)(n_L - n_{air})}{n_L(4f_{th} - L_R - 2d_0)}.$$ Equation 7 where $n_L$ is the refractive index of the amplifier gain medium and $n_{air}$ is the refractive index of air, both at the laser wavelength. The above equations give an approximate method for calculation of the rod-end radius of curvature required to optimally couple into an amplifier module with a strong thermal lensing component. More complex models can be used, for example using a graded index (GRIN) lens model of the thermal lens rather than the thin lens model used above.

In systems of very high gain, small back reflections from the input surface of the amplifier may upset the performance of the oscillator. In this case, the input surface can be tilted slightly in order that back reflections do not return to the oscillator. The output surface can be tilted in an anti-parallel manner to offset the effects of astigmatism introduced by tilting a curved lensing component.

If the amplifier module is fully pumped but no input beam is present, the thermal lens will be slightly stronger. This can be offset by reducing the pump power to a level that mimics the thermal lens when a high power input beam is present. These effects are thermal, and therefore apply when the amplifier is pumped but unused for a duration comparable to the thermal equilibrium time of the gain medium (determined by the thermal conductivity and dimensions). Preferably, the laser and amplifier are pumped simultaneously.

The amplifier module may be symmetrical and identical to the laser module in the embodiment described above, but the radius of curvature of the exit end of the rod may be chosen in a similar fashion to the method above for any required exit image position such that asymmetric and other variations can be accommodated.

Figure 15:
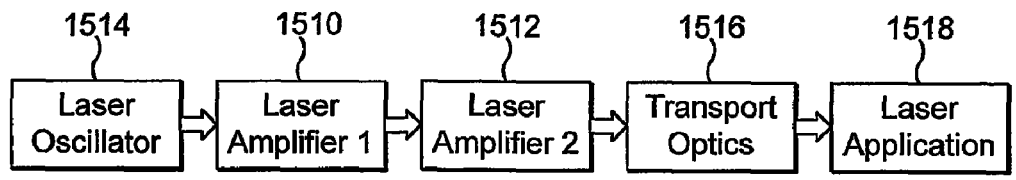
FIG. 15 shows multiple amplifier modules.

The invention gives rise to a number of advantages. Each amplifier module increases the output power by approximately 200 W respectively. Multiple amplifiers 1510 and 1512 may be cascaded together as shown in FIG. 15 to produce very high average powers from a laser oscillator source 1514 (hundreds of watts to multiple kilowatts) delivered via transport optics 1516 to a laser application 1518; the only limit is the damage threshold of the laser gain media or coatings used, or self-imposed limits on efficiency defined by the input beam fluence and the saturation fluence of the gain medium used. The output pulse duration of the emission is nominally unchanged with addition of amplifier gain modules. The output beam quality ($M^2$) is raised by only approximately 1.5 by each additional gain module.

Amplifiers may be applied to a number of different sources including high power (>100 W) pulsed (Q-switched or modelocked) oscillators in, for example, a Power Oscillator Power Amplifier (POPA) configuration as discussed herein. They may also be used for continuous wave (CW) oscillators (high and low power); low power (<100 W) Q-switched, modelocked, or CW oscillators; fiber oscillators; picosecond, nanosecond, microsecond, or millisecond oscillators; and in a range of applications such as thin-film ablation and surface cleaning applications.

Figure 16:
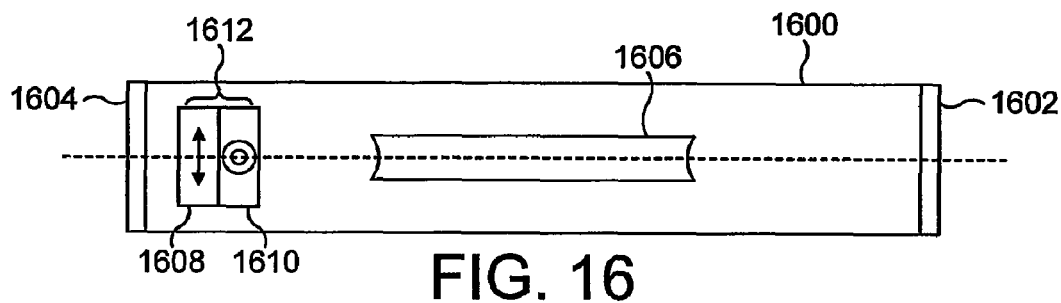
FIG. 16 is a schematic side view of a Q-switched cavity according to the present invention.

Referring now to FIG. 16, a further embodiment of the invention is shown having a laser gain medium 1606, an optical cavity 1600 defined by mirrors 1602 and 1604, one of which is partially reflective as described above. Also provided between the gain medium and one of the mirrors is a Q-switch 1612 having a pair of adjacent acousto-optical (AO) modulators 1608 and 1610 formed of fused silica or other appropriate material, in Bragg, near Bragg, Raman-Nath or near Raman-Nath alignment. As is well known, the AO modulators 1608 and 1610 provide switching of laser radiation by preventing the build up of oscillations in the optical cavity 1600. The AO modulators 1608 and 1610 have orthogonal polarization axes with respect to the other, passing light of all polarizations when deactivated. When the crossed AO modulators 1608 and 1610 are activated by an RF signal, light oscillations of any polarization are prevented, by blocking the optical path between the gain medium 1606 and one of the mirrors 1604, resulting in an increased population inversion in the gain medium 1606. Preferably a pair of compressional (longitudinal), acousto-optic (AO) modulators are provided to Q-switch the cavity. Compression cells are used, as they are capable of rapid switching, which is important for high gain, fast build-up time lasers as described.

As a result of such an arrangement Q-switching can be achieved for pulsed unpolarized laser light resulting in increased power delivery. This increased power is due to a lack of sensitivity of the cavity to depolarization losses. Often a polarizer is used to reject depolarization losses arising from thermal aberrations in the gain medium. By allowing all polarization states to lase, no light is lost due to depolarization.

Figure 17:
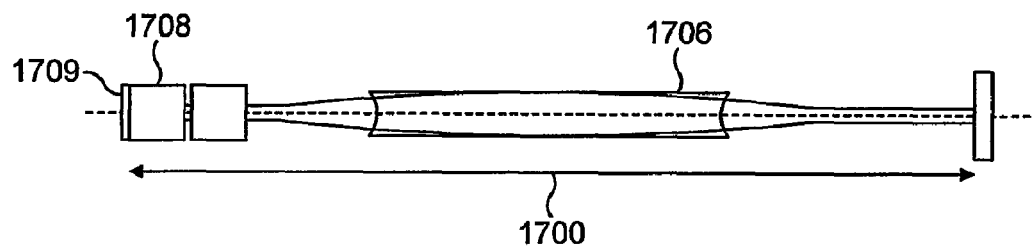
FIG. 17 is a schematic side view of a cavity incorporating a Q-switch according to another embodiment of the invention.

Additionally, the embodiment of FIG. 16 can be modified, as shown in FIG. 17, where a single AO modulator or pair of adjacent crossed AO modulators, forming a Q-switch as described above, can replace the fully reflective or output coupling cavity mirror. The AO modulator 1708 at the extreme of the cavity 1700 has a high reflection coating 1709 on the side distal to the gain medium 1706, such that it acts as a cavity mirror to reflect light within the cavity or to couple light out of the cavity. The AO modulator must be cut, polished, and coated such that it is pre-aligned according to the correct operation mode (i.e. Bragg, near Bragg, Raman-Nath, or near Raman-Nath) and that the mirror surface must retroreflect light back into the cavity. This allows the AO modulators to be placed as close as possible to the ends of the cavity for fastest switching time. A fast switching time is important for high power, high gain lasers as described earlier.

An addition to the high power, Q-switched laser described herein may be employed when it is used to provide bursts of pulses. When bursts of pulses are generated, pulses near the beginning of the burst may have anomalously high or low energy (and/or intensity) and may be unstable. There are two sources of this problem: thermal variations (longer timescale, ~100 ms-~1 s) and gain variations (shorter timescale, ~10 s-~1 ms). The solution to the problem comes from modulation of the pump diode power. This can be achieved by suitable temporal modulation of the diode power supplies used to power the gain modules (in the oscillator or in the amplifier). To correct for longer timescale problems, the diode power is reduced to a quiescent level (of the order of 5% below the normal operating power) between bursts of pulses to compensate for variations in the thermal lens. Diode power is briefly (~1 ms) further reduced (below the threshold power required for the cavity to lase) to compensate for gain variations. This method (applicable for any Q-switched, diode pumped laser), in conjunction with other AO pulse control methods (for example, First Pulse Suppression) provides full control of the pulses of a burst emitted by the laser for any duty cycle and repetition rate.

Figure 18:
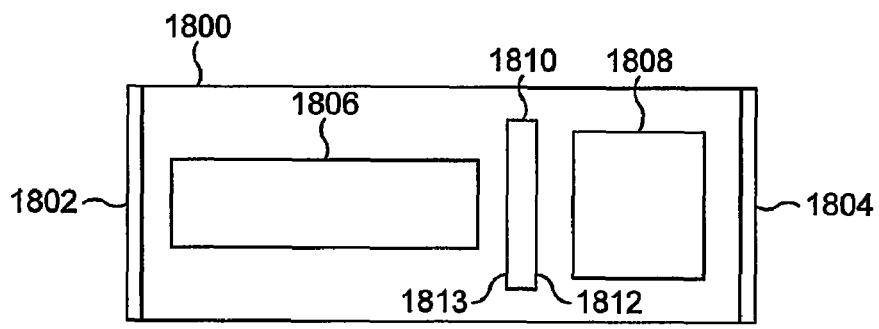
FIG. 18 is a schematic side view of a laser cavity including a frequency doubler according to an embodiment of the present invention.

Referring now to FIG. 18, a further embodiment of the invention is shown comprising a laser cavity 1800 bounded by mirrors 1802 and 1804 and having therein a laser rod 1806. In the embodiment shown, the laser rod has generally flat ends, but it can be profiled in any appropriate alternative manner, as discussed in detail above.

Also provided in the cavity is a frequency doubler 1808. The component can be any appropriate harmonic generator or nonlinear crystal such as LBO. As is well known, the frequency doubler 1808 provides an output laser beam having a doubled frequency relative to that input from the laser rod 1806. Placed intermediate to the laser rod 1806 and frequency doubling element 1808 is an in-line mirror 1810. The in-line mirror is coated, for example, on its side 1812 adjacent to the frequency doubling element 1808, with a high reflective coating at the doubled frequency to reflect light of the doubled frequency and an anti-reflection coating to pass light at the fundamental frequency. Also, the other side of this optic 1813 may be coated with an anti-reflection coating to pass light at the fundamental frequency. As a result, the mirror 1810 forms with the cavity end mirror 1804 of a non-resonant sub-cavity, thereby removing unnecessary optics from the cavity. Doubled frequency laser light is output from the cavity via the end mirror 1804, which carries a highly reflective coating at the fundamental frequency and an anti-reflection coating at the doubled frequency.

An effective way of producing maximum frequency doubled power by second harmonic generation is by aligning a medium $M^2$ beam with a nonlinear crystal with a large acceptance angle and moderate linear coefficient. A large acceptance angle in the doubling element is required due to the fact that the higher $M^2$ beams contain a distribution of propagation vectors. Nonlinear crystals with large acceptance angles generally do not have high nonlinear coefficients. An appropriate nonlinear crystal for conversion of a fundamental beam with a wavelength 1064 nm and an $M^2$ between 20 and 30 to the second harmonic at 532 nm is LBO. However, it is also possible to convert to wavelengths of 355 nm and for 266 nm using appropriate converters, or any other conversion frequency.

It will be appreciated that any appropriate components can be used for the arrangement shown in FIG. 18. For example, a suitable laser rod such as Nd:YAG can be adopted, and the frequency conversion element can obtain any appropriate harmonic generation crystal in the form of any appropriate material such as, for example LBO for multimode or Beta Barium Borate (b-BaB$_2$O$_9$, referred to herein as BBO) for single mode (TEM$_{00}$) conversion. Similarly, the intermediate mirror 1810 and cavity end mirrors can be of any appropriate type and can carry, for example, a coating such as a multi-layer, thin film dielectric coating to ensure appropriate frequency selection. The intracavity mirror may also be abandoned by placing the appropriate thin film coating, similar to that on surface 1812, on the face of the nonlinear crystal closest to the gain module.

The conversion efficiency using this method is improved in three ways over standard extra-cavity doubling techniques. First, intracavity doubling takes advantage of high intracavity intensities to increase the conversion efficiency due to the nonlinear nature of the process. Second, the intermediate mirror allows doubled light generated by passing either way through the doubling crystal to exit the laser collinearly and in the same direction. Third, the fundamental radiation cannot escape from the cavity except via frequency doubling. As a result, a pure and immediately usable output is provided at the doubled frequency. Furthermore the collinear arrangement provides the advantage of simplicity over, for example, a folded cavity.

Enhancements to the conversion efficiency are gained by placing the nonlinear crystal inside the laser cavity. The non-linear conversion process requires that the fundamental beam has sufficient intensity to drive the crystal into the nonlinear regime. Improved conversion efficiency can be achieved outside the cavity by beam focusing to reduce the beam size and hence increase the intensity. This serves to increase the distribution of propagation vectors in the beam and can lead to reduced conversion efficiency of the higher order modes. Whether the beam is focused or not, extra-cavity conversion leads to $M^2$ filtering (high order modes will not be converted efficiently) and therefore reduced overall conversion efficiency. The intensity inside a laser cavity is generally much higher than in the output beam. Much higher conversion efficiencies can be achieved by placing the nonlinear crystal inside the laser cavity.

By placing the nonlinear crystal inside the laser cavity (intra-cavity), frequency conversion acts as an output coupler; the fundamental radiation in the cavity can only be released if it is converted to another wavelength. This further improves the total output efficiency, because if fundamental radiation is not converted on the first pass through the nonlinear crystal, it will be converted on the second pass, the third pass, etc., and with every round trip it is amplified in the laser gain medium.

Intra-cavity conversion offers advantages in terms of $M^2$ filtering. With extra-cavity conversion, high order modes are stripped from the beam as they are inefficiently converted (i.e., there is a lower probability of conversion for higher order modes). Low conversion probability is not a problem inside the cavity as high order modes can only be coupled out when they are frequency converted; they continue to oscillate in the cavity until they are converted. This means that $M^2$ filtering is much less of an issue.

Part of the reason that the cavity emits a beam with high $M^2$ is due to aberrations (generally in the gain medium, due to thermal effects). Aberrations provide cross talk between transverse cavity modes that allows energy to flow from high order modes to lower order modes and vice versa. Cross talk can help improve the overall conversion efficiency of the cavity. Energy in a high order mode will have a higher probability of conversion if it is scattered into a lower order mode by aberrations than if it were scattered into a higher mode, which is possible using an intra-cavity crystal where modes continue to oscillate until they are converted. This will lead to an overall reduction in the $M^2$ and improved conversion efficiency.

The laser cavity is designed to operate at the maximum $M^2$ the system will support in conjunction with a nonlinear crystal with a large acceptance angle placed inside the cavity (intra-cavity). This gives the laser a degree of stability in terms of robustness to changes in thermal lensing (due to natural differences between gain modules or changes due to pump diode aging).

In the frequency doubling process, the temperature of the doubling crystal is critical to the conversion efficiency and stability of the laser. The warm-up time of the laser can be dramatically improved by using a crystal pre-cooling technique. When the laser makes the transition from a non-lasing state to a lasing state, the thermal loading on the frequency doubling crystal increases suddenly. As a consequence, the temperature of the crystal increases, reducing the doubling efficiency. The crystal temperature control system then takes time to reduce the temperature of the crystal to the optimum conversion point. The warm-up time is reduced by setting the crystal temperature to a value lower than the optimum doubling temperature while the laser is in the non-lasing state. When the laser is then turned on, the sudden increase in thermal loading increases the temperature of the crystal towards the optimum conversion point. The set point of the cooling system is increased towards the optimum conversion temperature as the crystal temperature increases thus reducing the temperature overshoot and warm-up time.

The doubling crystal cooling system includes: a heat conductive crystal mount (for example, made of copper); a heat transfer pump (such as a thermo-electric cooler); a heat sink (such as a water cooled block); and a temperature sensor placed close to the crystal. The crystal is cooled by pumping heat from the crystal mount to the heat sink and is heated by pumping heat from the sink to the crystal mount. The temperature of the crystal is set by and controlled by any suitable Proportional Integral Differential temperature controller (PID controller). An example temperature set-point might be 25° C.

It will be appreciated that a laser of the type described can be adopted for a range of possible applications, for example laser ablation, cutting, and drilling.

It will be appreciated that components and elements from the various embodiments described above can be interchanged and juxtaposed as appropriate. Although the discussion is directed to an Nd:YAG laser, any appropriate laser material can be adopted. Additionally, it will be appreciated that any appropriate gain medium, pumping scheme, or source and cooling scheme can be adopted, and that the rod ends can be profiled in any appropriate manner to provide refractive or diffractive (e.g. Fresnel) lenses or GRIN lenses effectively mounted on the ends. Similarly, any appropriate optical gain cavity configuration and pumping scheme can be implemented as well as any appropriate mode of pulsed or continuous operation.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A laser amplifier including a solid state laser gain medium, the solid state laser gain medium having first and second ends along a laser optical axis in which each end is profiled concave to provide a level of thermal lens compensation at a desired operating pump power such that the beam has a beam quality factor $M^2$ maximized at the desired operating pump power, wherein the solid state laser gain medium is configured to operate in a laser oscillator cavity that is optically symmetrical and includes flat cavity end reflectors, said laser amplifier further comprising:
   a laser cavity; and
   an amplifying module external to the laser cavity, said amplifying module sharing a common axis of emission with said laser cavity and comprising an amplifier gain medium having first and second ends along said axis of emission;
whereby at least one of said first or second ends of said amplifying module is profiled to produce a lensing effect so as to directly couple light from said laser cavity into said amplifying module.

2. A laser amplifier as defined in claim 1, wherein the solid state laser gain medium is configured to operate in a laser oscillator cavity arranged to incorporate a Q-switch or further gain modules.

3. A laser amplifier as defined in claim 1, in which the solid state laser gain medium is formed of Nd:YAG.

4. A laser oscillator cavity including a solid state laser gain medium as defined in claim 1.

5. A laser oscillator cavity as defined in claim 4, further comprising:
   a Q-switch having first and second acousto-optic cells in respective first and second non-parallel polarization orientations, wherein at least one of said first and second acousto-optic cells has a reflective end forming a cavity end reflector.

6. A laser oscillator cavity as defined in claim 4, further comprising:
   a frequency converter; and
   a frequency selective reflector between the solid state laser gain medium and the frequency converter.

7. A laser including a solid state laser gain medium as defined in claim 1.

8. A laser as defined in claim 7, further comprising:
   a side-pumping diode element.

9. A laser ablation device comprising a laser as defined in claim 7.

10. A laser amplifier as defined in claim 1, wherein one or both of said first or second ends of said amplifying module are profiled to form an amplifier lens having a predetermined focal length in order to maximize the beam quality factor $M^2$ of the laser cavity at a desired pump power, and wherein the amplifier lens is one of a refractive lens, a diffractive lens, or a GRIN lens.

11. A laser amplifier as defined in claim 10, wherein said at least one end of said solid state laser gain medium is profiled to form a first lens having a focal length that is substantially equal to the focal length of said amplifier lens.

12. A laser amplifier as defined in claim 1, whereby said laser gain medium lens and said amplifier gain medium lens are concavely profiled.

13. A laser amplifier as defined in claim 1, wherein said laser gain medium and said amplifying gain medium are pumped simultaneously, and wherein said laser gain medium pump and said amplifying pump have equal power.

14. A laser amplifier as defined in claim 1, in which an input surface to the amplifying module is tilted.

15. A laser amplifier having:
   a laser cavity; and
   an amplifying module external to the laser cavity, said amplifying module sharing a common axis of emission with said laser cavity and comprising a laser gain medium having first and second ends along said axis of emission;
whereby at least one of said first or second ends is profiled so as to directly couple light from said laser cavity into said amplifying module;
wherein said laser gain medium and said amplifying medium are pumped simultaneously;
wherein in said module for an amplifier medium comprising a rod of diameter $D_R$, length $L_R$, refractive index $n_L$, refractive index of air $n_{air}$, and thermal focal length $f_{th}$ arranged to receive an input beam from a laser having waist distance $d_0$ from the input rod end, the rod is profiled with a radius of curvature R given approximately by $$R = \frac{d_0(4f_{th} - L_R)(n_L - n_{air})}{n_L(4f_{th} - L_R - 2d_0)}.$$

16. A method of designing a laser amplifier having a profile as defined in claim 15.

17. A laser assembly comprising a gain medium as defined in claim 1 and an amplifier as defined in claim 1 coupled therewith.

18. A module as defined in claim 13, in which, for an amplifier medium comprising a rod of diameter $D_R$, length $L_R$, refractive index $n_L$, refractive index of air $n_{air}$, and thermal focal length $f_{th}$ arranged to receive an input beam from a laser gain medium having waist distance $d_0$ from the input rod end, the rod is profiled with a radius of curvature R given approximately by $$R = \frac{d_0(4f_{th} - L_R)(n_L - n_{air})}{n_L(4f_{th} - L_R - 2d_0)}.$$

* * * * *